Patented June 29, 1948

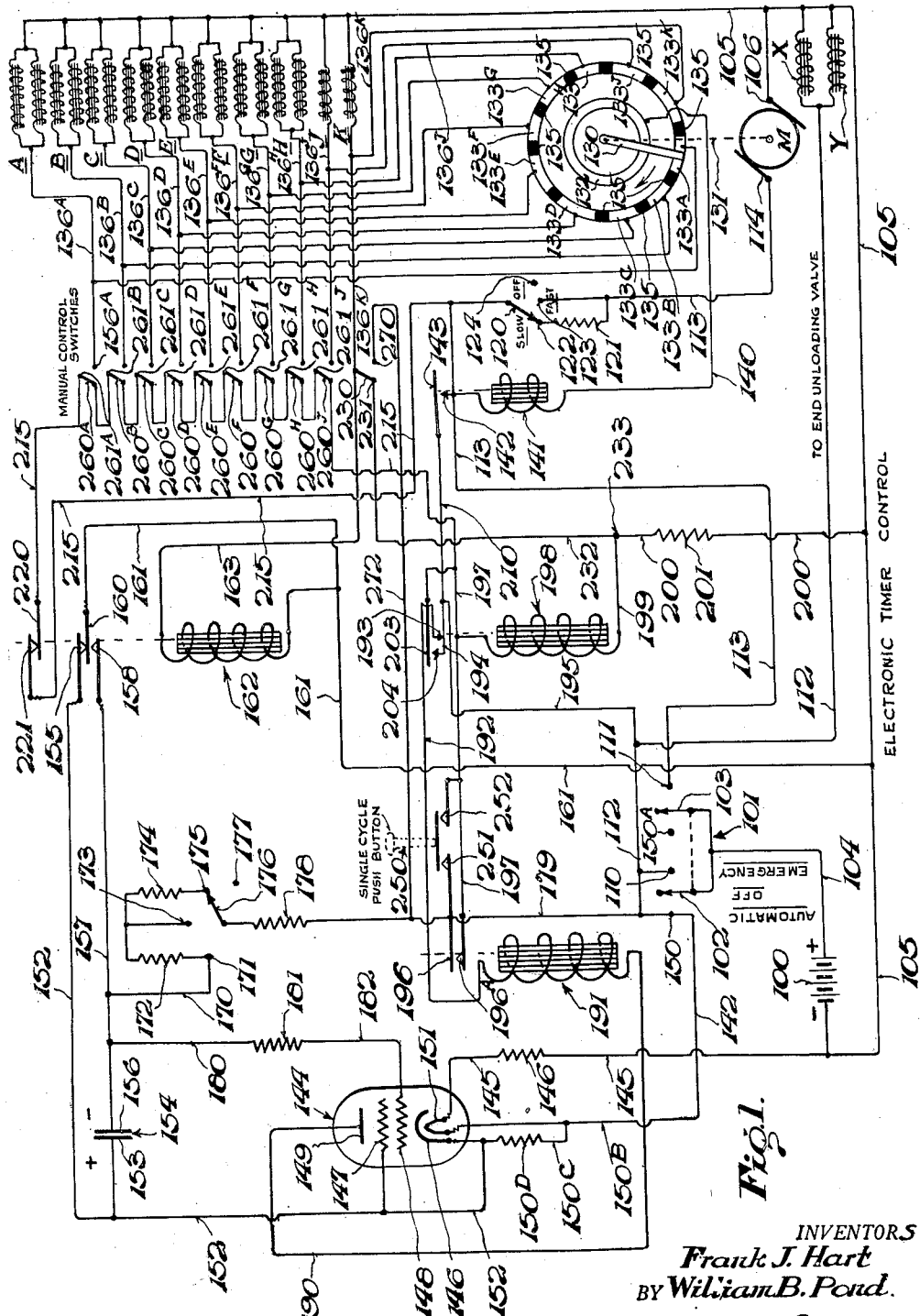

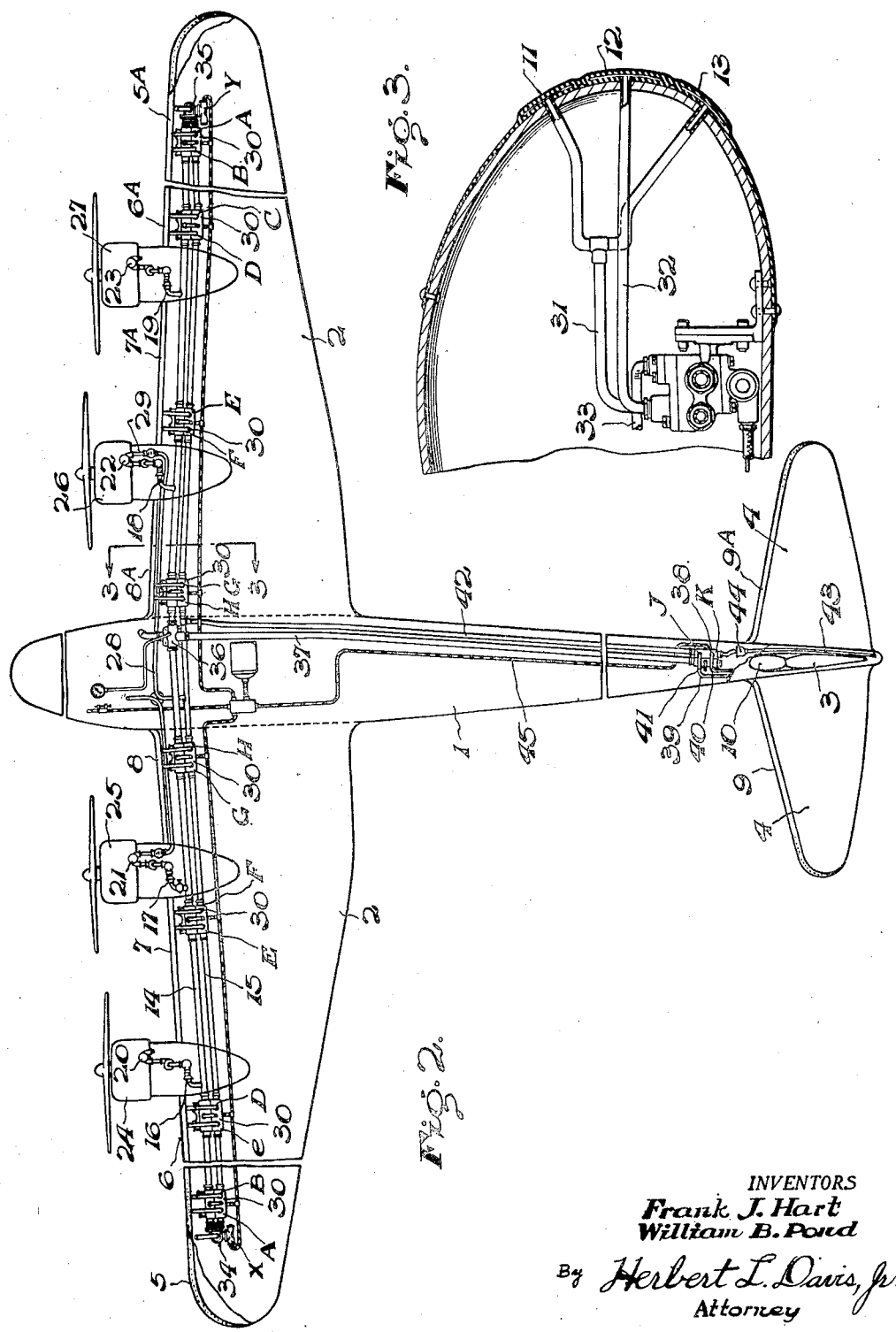

2,444,209

UNITED STATES PATENT OFFICE 2,444,209

ELECTRONIC TIMER CONTROL FOR INFLATABLE BOOTS ON AIRCRAFT

William B. Pond, Burbank, Calif., and Frank J. Hart, Englewood, N. J., assignors to Bendix Aviation Corporation, Teterboro, N. J., a corporation of Delaware Application December 18, 1944, Serial No. 568,790

13 Claims. (Cl. 244—134)

1

The present invention relates to a control system and more particularly to an electronic timer for controlling the inflation of suitable inflatable units or boots mounted upon airplane wings and other airfoils and surfaces of aircraft for the purpose of preventing the accumulation of ice.

The basic idea of the inflatable rubber is to permit ice to form on a surface and then to distort that surface so as to break the ice into pieces free from the surface which can be carried away by the airstreams, as shown for example in the Patent No. 1,990,866 to David Gregg, dated February 12, 1935. The present invention relates to improvements in a timer system such as shown in the copending application of Donald M. Lawrence, David Gregg and Myron L. Taylor, Serial No. 498,248, filed August 11, 1943. The latter system has provided means for inflating and deflating the boots, including means whereby the control of such boots is reduced to an electrical circuit embodying suitable solenoids for operating the boots.

An object of the present invention is to provide an improved variable cycle timer for such system.

Another object is the provision of novel means for terminating the operation of the timer in a home position.

Another object is to provide novel means whereby single cycle operation of the system may be effected so that each boot may be inflated and deflated in correct sequence and then held in a deflated condition until such time as the cycle of operation is repeated.

Another object of the invention is to provide novel means for effecting automatic operation of an ice eliminating system, including adjustable means for varying the time interval between cycles of operation.

Another object of the invention is to provide novel means for effecting manual control of the boots whereby any one of a series of boots may be selectively inflated for as long a time interval as desired and as often as desired.

Another object of the invention is to provide novel means for providing automatic operation of the system and manual control of the boots during such automatic operation.

Other objects and advantages of this invention are set forth in the following description, taken with the accompanying drawings; and the novel features thereof are pointed out in the appended claims. The disclosure, however, is illustrative only and we may make changes in detail, especially in matters of shape, size, and arrangement of parts within the principle of the invention, to

2 the full extent indicated by the broad and general meanings of the terms in which the appended claims are expressed.

In the accompanying drawings which form a part of this specification like reference characters indicate like parts in the several views wherein:

Figure 1 illustrates diagrammatically one form of the electronic de-icer control.

Figure 2 illustrates diagrammatically the control system as applied to an aircraft de-icer system.

Figure 3 is a cross-sectional view taken along the line 3—3 of Figure 2 and looking in the direction of the arrows.

In Figure 4 our control system is illustrated as applied to an aircraft ice eliminating system such as described in the copending application of Donald M. Lawrence, David Gregg, and Myron L. Taylor, Serial No. 498,248, filed August 11, 1943, and in the copending application of Myron L. Taylor and Samuel K. Lehman, Serial No. 498,249, filed August 11, 1943, now U. S. Patent No. 2,405,362, granted August 6, 1946, and assigned to Bendix Aviation Corporation.

In the disclosure of Figure 2 to which our novel control system may be applied there is shown an airplane comprising a fuselage 1 having wings 2 and rear vertical and horizontal stabilizers 3 and 4 respectively.

A plurality of expandable boot units of the type disclosed in the aforenoted Patent No. 1,990,866 to David Gregg are mounted at the leading edge of the forward wing 2. These expandable units are indicated on the forward port wing by the numerals 5, 6, 7 and 8, while on the starboard wing corresponding expandable units are indicated by numerals, 5A, 6A, 7A, and 8A. Expandable units are further provided at the leading edge of the rear horizontal stabilizers indicated at the port side by the numeral 9 and at the starboard side by the numeral 9A. A further expandable unit 10 is provided at the leading edge of the vertical stabilizer 3 as shown in Figure 2.

Each of said expandable units are constructed of elastic rubber-like material suitably reinforced and secured upon the wing or other airfoil and each unit comprises one or more inflatable tubes. For simplicity of illustration each boot is shown as comprising three inflatable tubes, indicated in Figure 3 by the numerals 11, 12 and 13. The tubes 11 and 13 are arranged for inflation and deflation together, while the tube 12 is separately inflatable from the tubes 11 and 13.

Extending spanwise of the forward wings 2 are main air pressure and suction conduits indicated by numerals 14 and 15, respectively. The air pressure conduit 14 is connected by conduits 16, 17, 18 and 19 to suitable air pressure pumps 20, 21, 22 and 23 driven by the airplane motors 24, 25, 26 and 27, respectively. The suction conduit 15 is connected by a conduit 28 to a suction conduit 29 leading from the pump 22.

As shown in Figure 2, separate distributor valve units 30 are provided for independently controlling the expansion and contraction of the aforesaid units. The said distributor valves 30 are connected directly into the main pressure and suction lines 14 and 15, respectively, as shown in Figure 2, and control the inflation and deflation of the inflatable tubes 11 and 12 of the unit, shown in Figure 3, through a conduit 31 while the tube 12 is controlled through a conduit 32. The exhaust pressure from said tubes 11, 12 and 13 is conducted outward through the exhaust or overboard conduit 33 during deflation of the tubes 11, 12, and 13.

Provided at the opposite ends of the spanwise extending conduits 14 and 15 are manifold unloading valves 34 and 35 for releasing the pressure within the line 14 when the boots are not in use. The manifold unloading valves are preferably of the type described in the copending application of Myron L. Taylor and Samuel K. Lehman, Serial No. 498,249, filed August 11, 1943, now U. S. Patent No. 2,405,362, granted August 6, 1946, and assigned to Bendix Aviation Corporation. The valves 34 and 35 are controlled by solenoids X and Y electrically operated through suitable electrical connections as shown in Figure 1, whereby upon energization of the solenoids X and Y the release valves 34 and 35 are closed, while upon de-energization of the solenoids X and Y the pressure within the manifold 14 is unloaded to atmosphere through the valves 34 and 35.

A suitable relief valve 36 is mounted intermediate the opposite ends of the spanwise extending pressure conduit 14 for relieving the pressure within the conduit 14 upon the same increasing beyond a predetermined maximum value.

There is connected at the relief valve 36 a second pressure line 37 which extends longitudinally of the plane to a distributor valve 38 positioned at the rear of the plane. The distributor valve 38 is arranged for controlling through conduits 39 and 40 the inflation and deflation of tubes provided within the expandable units 9, 9A and 10 which correspond to the tubes 11, 12 and 13 previously described. The exhaust pressure from the tubes during deflation is conveyed outward through conduit 41.

A suction line 42 connects the said distributor valve 38 to the main suction line 15. A second suction line 43 extends from the distributor valve 38 to the low pressure area of the plane. A suitable control valve 44 regulates the line 43 so as to open the same upon a decrease in the suction force exerted at the line 42 below a predetermined minimum value so as to exert in such event an added suction force to the line 42.

The distributor valves 30 and 38 are controlled by a pair of solenoids mounted in each as explained in the aforenoted copending application of Donald M. Lawrence, David Gregg, and Myron L. Taylor, Serial No. 498,248, filed August 11, 1943. The distributor system shown in Figure 2 is symmetrical, in that the units mounted on the starboard side of the airplane follow the arrangement on the port side.

Moreover, as shown in Figure 1, the solenoids A, B, C, D, E, F, G, and H are provided in pairs. The solenoids of each pair are mounted at opposite sides of the airplane for operating correspondingly positioned units, as shown in Figure 2, and further the solenoids of each pair are arranged for joint energization, as shown diagrammatically in Figure 1. The solenoids J and K control the distributor valve 38. The solenoids A, B, C, D, E, F, G, H, J, and K are controlled by the electronic timer control, as will be explained.

As described in detail in the aforenoted application of Donald M. Lawrence, David Gregg, and Myron L. Taylor, Serial No. 498,248, filed August 11, 1943, the said solenoids are arranged so that upon energization thereof the boot tube or tubes controlled thereby will be inflated, while upon de-energization thereof the said boot tube or tubes will be deflated. As shown in Figure 2 a cable 45 carries the necessary electrical conductors for controlling the energization of the respective solenoids. The time interval of operation for each unit, and the time interval between cycles of operation, will of course be determined by the electronic timer of Figure 1.

Now referring to the drawing of Figure 1 there is provided a suitable source of electrical energy indicated by the numeral 100 which may be connected into the novel control circuit by operation of a double pole switch 101 having the interconnected arms 102 and 103. The positive terminal of the source of electrical energy 100 is connected by an electrical conductor 104 to the switch arms 102 and 103 respectively.

The negative terminal of the source of electrical energy 100 is connected by a conductor 105 to one terminal of each of the respective control solenoids A, B, C, D, E, F, G, H, J, K, X and Y. The conductor 105 is also connected to one terminal 106 of a motor M.

As will be readily seen, with the switch 101 in the position shown in Figure 1, the circuit to the respective control solenoids and motor M is open and the de-icer system is not in operation.

The system may be placed in operation by manually shifting the switch 101 so as to actuate the switch arm 102 and 103 in a clockwise direction closing switch contacts 110 and 111. The switch contact 110 is connected by an electrical conductor 112 to the opposite terminal of the solenoids X and Y from that to which the electrical conductor 105 is connected and thus the solenoids X and Y are energized so as to close the pressure release valves 34 and 35 as previously explained. The circuit for energizing the solenoids X and Y is connected from the positive terminal of the source of electrical energy 100 through conductor 104, switch arm 102, contact 110, conductor 112, through electromagnets X and Y, and conductor 105 to the negative terminal of the source of electrical energy 100.

The switch contact 111 is connected through an electrical conductor 113 to another terminal 114 of the motor M. Thus upon switch arm 103 closing the contact 111 the motor M is energized by the source of electrical energy 100.

A switch 120 is provided in the circuit 113 for connecting a resistance 121 in or out of the circuit 113 for controlling the speed of the motor M. Thus with the switch arm 120 in the position shown in Figure 1 closing a contact 122 leading to the resistance 121, the resistance 121 will be cut into the circuit of the motor M and the motor M will be driven at a relatively slow speed.

However, upon the switch arm 120 being manually adjusted so as to close switch contact 123 the resistance 121 will be cut out of the circuit of the motor M, whereupon the motor M will be driven at a relatively greater speed. If the switch arm 120 be adjusted to the contact 124 the circuit to the motor will be opened whereupon motor operation will cease.

The circuit for energizing the motor M is connected from the positive terminal of the source of electrical energy 100 through conductor 104, switch arm 103, contact 111, conductor 113, motor brush 114, brush 106, and conductor 105 to the negative terminal of the source of electrical energy 100.

The motor M is operably connected to an arm 130 through suitable driving means 131 indicated in dotted lines.

Upon energization of the motor M the arm is driven in contacting relation about a ring 132, successively closing contact segments 133A through 133K. Suitable insulation segments 135 separate the respective contact segments.

The ring 132 is connected by an electrical conductor 140 to one terminal of a relay solenoid 141 connected at its opposite terminal to the electrical conductor 113; and a relay contact 142. A relay switch arm 143 closes the switch contact 142 upon energization of the relay solenoid 141 for a purpose which will be explained hereinafter.

The switch contacts 133A through 133K are connected by suitable electrical conductors 136A through 136K to the opposite terminal of the respective control solenoids A through K from that connected to the conductor 105. Thus upon rotation of the arm 130 by the motor M, as the arm 130 closes a contact segment 133A through K a circuit will be successively closed and opened to the respective control solenoids A through K connected thereto, since the arm 130 is connected to the positive terminal of the source of electrical energy 100 by ring 132, conductor 140, relay solenoid 141, conductor 113, switch contact 111, switch arm 103, and conductor 104, while the opposite terminal of the said solenoids are connected to the negative terminal of the source of electrical energy 100 through the conductor 105. Of course, at such times as the arm 130 rests solely upon one of the insulation segments 135 there will be no circuit closed to any of the control solenoids A through K. The circuit for energizing the solenoids A through K is connected from the positive terminal of the source of electrical energy 100 through conductor 104, switch arm 103, contact 111, conductor 113, solenoid 141, conductor 140, ring 132, arm 130, contact segments 133A—K, conductors 136A—K, solenoids A—K and conductor 105 to the negative terminal of the source of electrical energy 100.

In the position of the switch 101 described, the power circuit is shunted around the electronic timer control and directly to the control motor M. The switch 101 may be placed in the latter position in time of emergency when the electronic timer may not be in an operative condition. Normally the electronic timer is used and the same is placed in operative condition by manually adjusting the switch arms 102 and 103 in a counterclockwise direction so that switch arm 102 closes contact 150 and switch arm 103 engages open contact 150A.

The contact 150 is connected to the electrical conductor 112 and thus the closing of the contact 150 by the switch arm 102 causes energization of the electromagnets X and Y as previously described.

Moreover, an electrical conductor 150B connects the contact 150 and thus the positive terminal of the source of electrical energy 100 to one terminal of a heater 151 of an electronic valve 144. The opposite terminal of the heater 151 is connected by an electrical conductor 145 through an electrical resistance 146 to the negative terminal of the source of electrical energy 100 so that energization of the heater 151 may be effected.

The electronic valve 144 has further provided a cathode 146, a shield grid 147, a control grid 148, and a plate 149.

An electrical conductor 150C leads from the conductor 150B through a resistance 150D to the cathode 146. The cathode 146 is also connected through an electrical conductor 152 to the shield grid 147; a plate 153 of a condenser 154; and a relay contact 155.

Relay contacts 155 and 158 are alternately closed by relay switch arm 160 connected by an electrical conductor 161 to the conductor 105 leading to the negative terminal of the source of electrical energy.

The switch arm 160 is normally biased under spring tension into contacting relation with contact 155. An electromagnet 162 is provided which upon energization biases the switch arm 160 into contacting relation with contact 158.

The electromagnet 162 has one terminal connected to the conductor 161 and the opposite terminal connected through an electrical conductor 163 to the electrical conductor 136K. Thus upon the arm 130 contacting the switch segment 133K the electromagnet 162 will be energized causing the actuation of the arm 160 so as to open the contact 155 and close contact 158. The closing of contact 158 by switch arm 160 will cause plate 156 of condenser 154 to be negatively charged through electrical conductor 157, switch contact 158, arm 160, conductor 161, and conductor 105, while plate 153 of condenser 154 will be positively charged, through conductor 152, resistance 150D, conductors 150C, 150B, contact 150, switch 102 and conductor 104. The charging circuit for the condenser 154 may be traced from the positive terminal of the source of electrical energy 100 through conductor 104, switch arm 102, contact 150, conductors 150B, 150C, resistance 150D, conductor 152, condenser 154, conductor 157, contact 158, switch arm 160, conductor 161 and conductor 105 to the negative terminal of the source of electrical energy 100.

Upon switch arm 130 moving from switch segment 133K to the insulation segment 135 separating switch segment 133K and 133A, the electromagnet 162 will be de-energized and switch arm 160 under spring tension will be biased so as to open contact 158 and close contact 155.

Electronic energy will then flow from the negative terminal of the source 100 through conductor 105, 161, switch arm 160, contact 155, and conductor 152 to the positively charged plate 153 of the condenser 154. Electronic energy will also flow from the negatively charged plate 156 of condenser 154 through conductor 157, and a conductor 170. The conductor 170 leads to a switch contact 171 connected in series to a resistance 172, a second contact 173, a second resistance 174, and a third contact 175. A switch arm 176 is arranged to selectively close the contacts 171, 173, 175, and an open contact 177 to select the resistance to be placed in the line 170. A third resistance 178 leads from the arm 176 to a conductor 179 leading to the contact 150, through the arm 102 and conductor 104 to the positive terminal of the source of energy 100.

There will thus be effected a discharging circuit for the condenser 154 which may be traced from the positive terminal of the source of electrical energy 100 through conductor 104, switch arm 102, contact 150, conductor 179, resistance 178, switch arm 176, contact 175, resistance 174, resistance 172, contact 171, conductor 170, conductor 157, condenser 154, conductor 152, switch contact 155, switch arm 160, conductor 161, and conductor 105 to the negative terminal of the source of electrical energy 100.

Thus electronic energy from the negatively charged plate 156 of the condenser 154 will flow to the positive terminal of the source of energy 100, the time interval for discharging the condenser 154 being determined by the resistance values cut into the line 170—179 by the switch arm 176. Thus by varying the value of such resistance the discharge time interval may be controlled.

Connected to the conductor 157 is a conductor 180 leading to a resistance 181 which has the opposite end thereof connected to the control grid 148 through a conductor 182. Thus during the discharge of the condenser 156 a negative charge will be placed on the control grid 148, while a positive charge will be placed on the cathode 146 through the conductor 152, so as to restrain the firing action of the electronic valve 144.

An electrical conduit 190 leads from the plate 149 of the electronic valve 144 to a solenoid 191. A second conduit 192 leads from the solenoid 191 to a contact 193 normally closed by a relay switch arm 194, biased under spring tension to the closed position. A conductor 195 leads from the relay switch arm 194 to the conductor 112, which in turn leads through switch arm 102 to the positive terminal of the source of electrical energy 100.

Thus upon the condenser 154 becoming discharged sufficiently to permit the firing of the electronic valve 144, the solenoid 191 will become energized. The energizing circuit for the solenoid 191 is connected from the positive terminal of the source of electrical energy 100 through conductor 104, switch arm 102, contact 150, conductor 112, switch 194, contact 193, conductor 192, solenoid 191, conductor 190, plate 149, cathode 146, conductor 152, contact 155, switch 160, conductor 161, and conductor 105 to the negative terminal of the source of electrical energy 100.

The solenoid 191 controls a relay switch arm 196 normally biased under spring tension to an open position relative to a relay contact 196A. The arm 196 is electrically connected to conductor 179 leading to the positive terminal of the source of electrical energy 100 through switch arm 102.

The relay contact 196A is connected by an electrical conductor 197 to a solenoid 198. The opposite terminal of the solenoid 198 is connected by a conductor 199 to a conductor 200 which leads through a resistance 201 to the conductor 105 leading to the negative terminal of the source of electrical energy 100.

Thus upon energization of the eelctromagnet 191 as upon the firing of the electronic valve 144 the switch arm 196 will be actuated by the electromagnet force of the solenoid 191 so as to close contact 196A causing energization of solenoid 198. The energizing circuit for the solenoid 198 is connected from the positive terminal of the source of electrical energy 100 through conductor 104, switch arm 102, contact 150, conductor 179, switch arm 196, contact 196A, conductor 197, solenoid 198, conductor 199, conductor 200, resistor 201, and conductor 105 to the negative terminal of the source of electrical energy 100.

Energization of solenoid 198 will in turn cause a relay switch arm 203 to close contact 204 and actuate spring biased switch arm 194 so as to open contact 193, previously described, whereupon the solenoid 191 will be deenergized.

Switch arm 203 is connected to electrical conductor 197, while switch contact 204 is connected through switch arm 194 to a conductor 210 leading to the relay switch arm 143 for a purpose which will be hereinafter explained.

It will be seen that upon switch arm 203 closing switch contact 204, a holding circuit will be closed through conductors 195 and 197 so as to maintain the electromagnet 198 energized, upon solenoid 191 being deenergized causing relay switch arm 196 to open contact 196A, as previously described. The holding circuit for the solenoid 198 is connected from the positive terminal of the source of electrical energy 100 through conductor 104, switch arm 102, contact 150, conductor 112, conductor 195, switch arm 194, contact 204, switch arm 203, conductor 197, solenoid 198, conductor 199, conductor 200, resistor 201, and conductor 105, to the negative terminal of the source of electrical energy 100.

Leading from the conductor 197 is a conductor 215 which connects the conductor 197 to the conductor 113 leading to the motor M previously described. It will be thus seen that upon relay switch arm 196 closing contact 196A the motor M will be energized and the relay switch arm 203 will upon the closing of contact 204 effect a holding circuit for maintaining the motor M energized after the opening of contact 196A. The holding circuit for the motor M is connected from the positive terminal of the source of electrical energy 100 through conductor 104, switch arm 102, contact 150, conductor 112, conductor 195, switch arm 194, contact 204, switch arm 203, conductor 197, conductor 215, conductor 113, brush 114 of motor M, brush 106 and conductor 105 to the negative terminal of the source of electrical energy 100.

Further upon relay switch arm 196 closing contact 196A, energization of relay 141 will also be effected, since the relay 141 will then be electrically connected to the source of electrical energy 100 from the positive terminal upon arm 130 closing segment 133A, through conductor 104, switch arm 102, contact 150, conductor 179, switch arm 196, contact 196A, conductor 197, conductor 215, conductor 113, solenoid 141, conductor 140, ring 132, switch arm 130, switch segment 133A, solenoid A, and conductor 105 to the negative terminal of the source of electrical energy 100. The relay switch arm 203 moreover will upon closing contact 204 effect a holding circuit for the latter solenoid 141 by shunting relay switch 196 through conductor 112, conductor 195, switch arm 194, contact 204, and switch arm 203 connected to the conductor 197.

Upon energization of the solenoid 141 the relay switch arm 143, normally biased under spring tension to an open position, will under the electromagnetic force of the solenoid 141 close contact 142 and thus effect a second holding circuit by shunting switch arm 203 through the electrical conductors 210 and 195 for maintaining the solenoid 141, the circuit to the commutator ring 132, and the circuit to motor M energized should the circuit 215 be broken, while the arm 130 is in contacting relation with one of the segmental contacts 133A through K.

A relay switch arm 220 controlled by the solenoid 162 is normally biased under spring tension so as to close contact 221 for normally maintaining the circuit 215 closed. However, upon energization of the solenoid 162 by the motor driven arm 130 contacting switch segment 133K as previously described the relay switch arm 220 will be biased under the electromagnetic force of the solenoid 162 so as to open contact 221. The energizing circuit for the solenoid 162 is connected from the positive terminal of the source of electrical energy 100 through conductor 104, switch arm 102, contact 150, conductor 112, conductor 195, conductor 210, switch arm 143, contact 142, solenoid 141, conductor 149, ring 132, arm 130, switch segment 133K, conductor 136K, conductor 163, solenoid 162, conductor 161 and conductor 105 to the negative terminal of the source of electrical energy 100. However, due to the holding effect of the relay switch arm 143 the circuits to the solenoid 141; the circuit through the segmental contact 133K and circuit to the motor M will continue to be energized and the motor M continues to drive the arm 130 along the segmental contact 133K, so long as the same is in contacting relation with the segment 133K.

A switch arm 230 connected to the conductor 163 is normally positioned so as to close a contact 231 to which there is connected an electrical conductor 232. The conductor 232 is connected to the conductor 200 at the point 233.

The solenoid 141 is formed of a relatively low resistance while solenoid 198 has a relative high resistance, thus upon the arm 130 contacting the segmental contact 133K, the potential drop across the relatively high resistance solenoid 198 is reduced, since the segmental contact 133K is connected to the negative side of the solenoid 198 at the point 233 through the conductor 232 and to the negative terminal of the source of electrical energy through the conductors 200, 105 and resistance 201. Such decrease in the potential drop across the solenoid 198 causes a sufficient deenergization of the solenoid 198 so that the relay arm 203 is released under spring tension opening contact 204 and causing spring tensioned arm 194 to close contact 193.

As previously set forth, the arm 130 contacting the segmental contact 133K causes energization of the solenoid 162, whereupon switch relay arm 160 will close contact 158 initiating the charging operations of the condenser 154 previously noted and preventing firing of the electronic valve 144 by placing a negative charge on the control grid 148.

Moreover, upon the arm 130 moving off of the segmental contact 133K and on to the insulation member 135 so as to open the contact 133K, the solenoids 141 and 162 will be deenergized. The deenergization of solenoid 141 will cause relay switch 143 to open contact 142. Thus the circuits controlling the motor M; the solenoid 141; the solenoid K; and the solenoid 162 will be opened.

Upon deenergization of the solenoid 162 the switch arm 160 will be biased under spring tension so as to open contact 158 and the condenser discharging operation will once again repeat itself.

However, if the switch 176 be moved in a clockwise direction so as to contact the open contact 177 it will be seen that the discharge circuit for the condenser 154 would remain open and thus the electronic valve 144 may be held from firing by the charge on the condenser 154.

In order to initiate operation of the control system a push button 250 is provided for closing contacts 251 and 252. Contact 251 is connected to conductor 179, while contact 252 is connected to conductor 197 so as to shunt contacts 196 and 196A upon push button 250 closing contacts 251 and 252. Thus the operation of the control system may be manually initiated.

In order to effect selective manual operation of the respective boot control solenoids A through J, there are provided the manually operable switches 260A through 260J, arranged so as to normally close the contacts 261A through 261J, which are connected through the switch arms 260A to 260J in series in the conductor 215.

The switches 260A through 260J are adapted to be manually operated so as to selectively open the respective contacts 261A through 261J and close contacts connected respectively to the conductors 136A to 136J as shown in Figure 1, so that energization of the solenoids A to J may be manually controlled by the pilot of the aircraft. The energizing circuit for the solenoids A—J is connected from the positive terminal of the source of electrical energy 100 through conductor 104, switch arm 102, contact 150, conductor 112, conductor 195, switch arm 194, contact 204, switch arm 203, conductor 197, switch arm 260, contact 261, conductor 136, solenoid J—A connected to conductor 136, and returning through conductor 105 to the negative terminal of the source of electrical energy 100.

In the case of the boot control solenoid K the switch 230 is arranged to be manually operated so as to open contact 231 and close contact 270. Contact 270 is connected through a conductor 272 to the conductor 179 and thereby to the positive terminal of the source of electrical energy 100 so that upon switch arm 231 closing contact 270 a circuit is completed for energizing solenoid K from the positive terminal of the source of electrical energy 100 through conductor 104, switch arm 102, contact 150, conductor 179, conductor 272, contact 270, switch arm 231, conductor 136K, solenoid K and through conductor 105 to the negative terminal of the source of electrical energy 100.

In the operation of the automatic control system, a cycle of operation may be initiated by energizing relay solenoid 198 and thereby closing its transfer contacts 203 and 204. The relay solenoid 198 may be energized momentarily by either pressing the manual push button 250 or by closing the relay contacts 196 and 196A of the plate relay solenoid 191 through operation of the electronic valve 144 as explained. Once energized the relay solenoid 198 remains energized deriving its power through its own contact arrangement until the contact arm 130 of the motor driven timer reaches position 133K. Since relay solenoid 141 has a lower resistance than relay solenoid 198 and relay solenoid 141 is shunted across the solenoid 198 when contact arm 130 closes segmental contact 133K the potential drop across relay solenoid 198 decreases permitting relay switch arm 203 to be biased under spring tension so as to open contact 204 and cause relay switch arm 194 to close contact 193.

The cycle of operation is terminated upon arm 130 opening contact 133K and resting on the insulation member 135.

The time interval between cycles of operation is of course determined by the interval of discharge of the condenser 154 through the resistance selected by the switch 176, while the interval of inflation of each boot element is controlled by the speed of rotation of the motor M which may be increased or decreased through switch 120.

Only one set of solenoids A, B, C, D, E, F, G, H, and J, may be manually operated at a time. This is due to the fact that all of the switches 260A through 260J are connected in series with each other and by reversing the position of any one of them causes the power supplied to all of the succeeding switches to be broken.

Moreover operation of the manually controlled switches 260 will not terminate the operation of the motor M nor the operation of the solenoids A to K controlled thereby since the motor M and solenoids A to K remain energized through the arm 130 due to the contact arrangement of the relays 198 and 141, until such time as the arm 130 moves to the insulation member 135, whereupon the solenoid 141 is deenergized and switch arm 143 opens contact 142 deenergizing the motor M. Upon switch arm 143 opening contact 142, the motor circuit is deenergized so long as one of the switch arms 260 is in open relation to a contact 261. The circuit for the motor M is reenergized upon the switch arms 260A—J once again closing the contacts 261A—J.

If the switch 176 be adjusted to open contact 177 for single cycle operation, the cycle of operation will terminate when the switch arm 130 rests solely on the insulation member 135 after opening contact 133K. Another cycle of operation may be then initiated by closing push button 250. In any of the other positions of the switch 176 automatic operation is effected by electronic valve 144 firing at the termination of the delay period required for the charge on the condenser 154 to leak off through the resistances selected by switch 176.

Although one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. In an ice elimination system having a plurality of ice eliminating units, motor means operating said ice eliminating units in a predetermined cycle of operation, and electronic valve means for controlling the said motor means so as to successively provide a predetermined delay period between each of the cycles of operation of said ice eliminating units, and operator-operative means for adjusting the said predetermined delay period.

2. In an ice elimination system having a plurality of ice eliminating units, motor means operating said ice eliminating units in a predetermined cycle of operation, and means controlled by the operation of said motor means for effecting cessation of operation of said motor means at the end of said cycle of operation, and electronic valve means controlled by said motor means for re-initiating operation of said motor means after a predetermined delay period.

3. In an ice elimination system having a plurality of ice eliminating units, electric motor means energized for a predetermined period of operation, switch means operated by said motor means for actuating said units in a predetermined cycle of operation, an electronic valve having an anode, a cathode and a control grid, a capacitor connected between the grid and the cathode, means controlled by said switch means for alternately charging and discharging said capacitor for controlling the operation of said electronic valve, means controlled by said switch means for de-energizing said electric motor means at the end of said cycle of operation, and means connected to the anode of said electronic valve for re-energizing said electric motor means after a predetermined delay period controlled by said capacitor.

4. In an ice elimination system having a plurality of ice eliminating units, electric motor means energized for a predetermined period of operation, switch means operated by said motor means for actuating said units in a predetermined cycle of operation, an electronic valve having an anode, a cathode and a control grid, a capacitor connected between the grid and the cathode, first relay means controlled by said switch means for alternately charging and discharging said capacitor for controlling the operation of said electronic valve, second relay means controlled by said switch means for de-energizing said electric motor means at the end of said cycle of operation, and third relay means connected to the anode of said electronic valve for re-energizing said electric motor means after a predetermined delay period controlled by said capacitor.

5. In an ice eliminating system having a plurality of ice eliminating units, manually operable means for effecting selective operation of said ice eliminating units, and means for operating said ice eliminating units in a predetermined cycle of operation which cycle of operation is interrupted by the manual operation of the first mentioned means.

6. In an ice elimination system having a plurality of ice eliminating units, means for operating said ice eliminating units in a predetermined cycle of operation, and manually operable switch means for selective operation of said ice eliminating units during such cycle of operation and independently thereof.

7. A time delay circuit controlling apparatus comprising, an electronic valve for controlling said circuit, electric motor means energized for a predetermined period for controlling the operation of said electronic valve, means controlled by said electric motor means for effecting deenergization of said electric motor means at the termination of said predetermined period, and means in said circuit and controlled by said electronic valve for effecting re-energization of said electric motor means after a predetermined delay period.

8. A time delay circuit controlling apparatus comprising an electronic valve having an anode and cathode connected in said time delay circuit and a control grid, a capacitor connected between the grid and cathode, electric motor means, relay means operated by said electric motor means for charging the capacitor and after the charging of said capacitor the relay means being operated by said electric motor means in such a manner as to simultaneously deenergize said electric motor means and effect the discharge of said capacitor, means for retarding the discharge of said capacitor, and means in said time delay circuit for effecting the reenergization of said electric motor means after a predetermined delay period.

9. The combination, comprising an electric motor, an energizing circuit for said motor, a rotatable switch arm driven by said motor, a plurality of switch segments for circuits controlled by said switch arm, said switch segments successively closed and opened by operation of said switch arm, a relay means operated upon closing one of said segments for opening another circuit, and another relay means for opening the energizing circuit of said motor upon said switch arm opening said one switch segment.

10. The combination, comprising an electric motor, an energizing circuit for said motor, a rotatable switch means driven by said motor, a plurality of switch segments for circuits controlled by said switch means, said switch segments successively closed and opened by operation of said switch means, means for opening the energizing circuit of said motor upon said switch means opening one of said switch segments, and means conditioned by said switch means for closing the energizing circuit for said motor after a predetermined delay period.

11. The combination comprising an electric motor, an energizing circuit for said motor, a plurality of switch contacts, means actuated by said electric motor for successively closing and opening said switch contacts, an electronic valve having a plate circuit and a control grid circuit, a capacitor connected in said control grid circuit, a first relay means connected in said plate circuit, second relay means for controlling the discharging and discharging of said capacitor, said second relay means energized upon the closing of one of said switch contacts for effecting the charging of said capacitor, and said second relay means deenergized upon the opening of said one switch contact for effecting the discharging of said capacitor, said capacitor upon discharging supplying a bias to said control grid for controlling said first relay means, and said first relay means controlling the energizing circuit for said electric motor.

12. The combination with an airfoil surface; of means for removing ice therefrom, an electric motor, a first circuit for energizing said electric motor, switch means driven by said electric motor for cyclically operating said ice removing means for predetermined time intervals, an electronic valve having a plate circuit and a control grid circuit, a capacitor connected in said control grid circuit, a charging circuit for said capacitor, a discharging circuit for said capacitor, a first relay means connected in said plate circuit, a second relay means, a second circuit for energizing said second relay means, said second circuit closed at one position of said switch means and opened at a succeeding position of said switch means, said second relay means energized upon the closing of said second circuit so as to close said charging circuit for said capacitor, and said second relay means opening said charging circuit upon the deenergization thereof and closing said discharging circuit for effecting a discharging operation of said capacitor, a third relay means controlling said motor circuit and controlled by the motor driven switch means, said third relay means simultaneously opening said first motor circuit upon the opening of said second circuit by the switch means, said capacitor during the discharging operation supplying a bias to said control grid for restraining energization of the first relay means in the plate circuit for a predetermined delay period, and said first relay means effecting the closing of the first motor circuit at the termination of said delay period for re-energizing said electric motor for cyclically operating said ice removing means.

13. In an ice elimination system having a plurality of ice eliminating units, electric motor means energized for a predetermined period of operation, switch means operated by said motor means for successively actuating said units in a predetermined cycle of operation, an electronic valve having an anode, a cathode and a control grid, a capacitor connected between the grid and the cathode, first relay means controlled by said switch means for alternately charging and discharging said capacitor for controlling the operation of said electronic valve, second relay means controlled by said switch means for deenergizing said electric motor means at the end of said cycle of operation, and third relay means connected to the anode of said electronic valve for re-energizing said electric motor means after a predetermined delay period controlled by said capacitor, and a plurality of manually operable switches connected in series for effecting selective operation of said ice eliminating units independently of said motor means.

WILLIAM B. POND.
FRANK J. HART.

REFERENCES CITED

The following references are of record in the file of this patent:

UNITED STATES PATENTS

| Number | Name | Date |
| --- | --- | --- |
| 1,880,367 | Stansbury et al. | Oct. 4, 1932 |
| 1,937,869 | Brown | Dec. 4, 1933 |
| 2,127,080 | Barker et al. | Aug. 16, 1938 |
| 2,250,847 | Torkelson | July 29, 1941 |
| 2,358,804 | Holloman et al. | Sept. 26, 1944 |
| 2,373,255 | McGoldrick | Apr. 10, 1945 |